United States Patent
Tomasulo et al.

(10) Patent No.: US 10,423,061 B2
(45) Date of Patent: Sep. 24, 2019

(54) MULTILAYER PHOTOCHROMIC ARTICLES

(71) Applicant: Transitions Optical, Inc., Pinellas Park, FL (US)

(72) Inventors: Massimiliano Tomasulo, Monroeville, PA (US); Cory Brown, Pittsburgh, PA (US); Elizabeth Ann Zezinka, Cranberry Township, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/746,104

(22) PCT Filed: Sep. 3, 2015

(86) PCT No.: PCT/US2015/048255
§ 371 (c)(1),
(2) Date: Jan. 19, 2018

(87) PCT Pub. No.: WO2017/039669
PCT Pub. Date: Mar. 9, 2017

(65) Prior Publication Data
US 2018/0210330 A1    Jul. 26, 2018

(51) Int. Cl.
*G03C 1/73* (2006.01)
*G02C 7/10* (2006.01)
(Continued)

(52) U.S. Cl.
CPC ............. *G03C 1/73* (2013.01); *C09B 57/00* (2013.01); *C09K 9/02* (2013.01); *G02B 5/22* (2013.01);
(Continued)

(58) Field of Classification Search
CPC .......... G03C 1/00; G03C 1/685; G03C 1/695; G03C 1/705; G03C 1/73; G03C 1/733; G03C 1/74; B32B 27/08; C03C 17/00; G02C 7/02; G02C 7/10; G02C 7/102; C09B 57/00; C09B 67/0083; G02F 1/00; G02F 1/0063; G02F 1/01; G02F 1/0126; G02F 1/03; G02F 1/07; G02F 1/1336;
(Continued)

(56) References Cited

U.S. PATENT DOCUMENTS 4,360,653 A   11/1982  Stevens et al.
4,556,605 A   12/1985  Mogami et al.
(Continued)

FOREIGN PATENT DOCUMENTS

EP    2804030 A1    11/2014
WO    0102449 A2    1/2001

*Primary Examiner* — Loha Ben
(74) *Attorney, Agent, or Firm* — The Webb Law Firm

(57) ABSTRACT

A multilayer photochromic article can include a photochromic substrate, which may include a first photochromic layer defining a surface of the substrate, and a second photochromic layer positioned between the surface of the photochromic substrate and a source of actinic radiation, and in which the photochromic substrate and the second photochromic layer are selected such that the fade half-life of the photochromic substrate or the half-life of the first photochromic layer defining the surface of the substrate are greater than the fade half-life of the second photochromic layer.

23 Claims, 1 Drawing Sheet

(51) Int. Cl.
*G02B 5/23* (2006.01)
*G02B 5/22* (2006.01)
*C09B 57/00* (2006.01)
*C09K 9/02* (2006.01)
*G02F 1/00* (2006.01)
*G02F 1/01* (2006.01)
*G02B 1/04* (2006.01)

(52) U.S. Cl.
CPC .............. *G02B 5/23* (2013.01); *G02C 7/102* (2013.01); *G02F 1/0063* (2013.01); *G02F 1/0126* (2013.01); *G03C 1/733* (2013.01); *C09K 2211/1018* (2013.01); *G02B 1/04* (2013.01); *G02B 5/223* (2013.01); *G02C 7/10* (2013.01)

(58) Field of Classification Search
CPC ... G02B 1/04; G02B 1/10; G02B 1/11; G02B 1/14; G02B 26/00; G02B 5/00; G02B 5/22; G02B 5/223; G02B 5/23; G02B 5/26; G02B 5/283; C09K 9/00; C09K 9/02; C09K 2211/1018; C08K 5/0008; C07D 311/78; C07D 311/92; C07D 311/94; C07D 407/12; C07D 409/04; C07D 493/04; C07D 495/04; C07D 495/06
USPC ....... 359/238, 241, 242, 244, 288, 289, 642, 359/885, 887, 890; 252/501.1, 582, 586, 252/588; 430/328, 366; 544/31, 79, 222, 544/375; 549/382; 351/159.01, 351/159.61–159.65
See application file for complete search history.

(56) References Cited

U.S. PATENT DOCUMENTS

| | | |
|---|---|---|
| 4,756,973 A | 7/1988 | Sakagami et al. |
| 4,798,745 A | 1/1989 | Martz et al. |
| 4,798,746 A | 1/1989 | Claar et al. |
| 4,873,029 A | 10/1989 | Blum |
| 4,889,413 A | 12/1989 | Ormsby et al. |
| 4,931,220 A | 6/1990 | Haynes et al. |
| 4,994,208 A | 2/1991 | McBain et al. |
| 5,166,345 A | 11/1992 | Akashi et al. |
| 5,200,483 A | 4/1993 | Selvig |
| 5,236,958 A | 8/1993 | Miyashita |
| 5,239,012 A | 8/1993 | McEntire et al. |
| 5,252,742 A | 10/1993 | Miyashita |
| 5,359,085 A | 10/1994 | Iwamoto et al. |
| 5,373,033 A | 12/1994 | Toh et al. |
| 5,475,074 A | 12/1995 | Matsuoka et al. |
| 5,488,119 A | 1/1996 | Fischer-Reimann et al. |
| 5,618,586 A | 4/1997 | Swarup et al. |
| 5,645,767 A | 7/1997 | Van Gemert |
| 5,658,501 A | 8/1997 | Kumar et al. |
| 5,753,146 A | 5/1998 | Van Gemert et al. |
| 5,821,287 A | 10/1998 | Hu et al. |
| 5,965,630 A | 10/1999 | Imafuku et al. |
| 5,965,631 A | 10/1999 | Nicolson et al. |
| 6,025,026 A | 2/2000 | Smith et al. |
| 6,060,001 A | 5/2000 | Welch et al. |
| 6,113,814 A | 9/2000 | Gemert et al. |
| 6,150,430 A | 11/2000 | Walters et al. |
| 6,153,126 A | 11/2000 | Kumar |
| 6,187,444 B1 | 2/2001 | Bowles, III et al. |
| 6,268,055 B1 | 7/2001 | Walters et al. |
| 6,296,785 B1 | 10/2001 | Nelson et al. |
| 6,348,604 B1 | 2/2002 | Nelson et al. |
| 6,353,102 B1 | 3/2002 | Kumar |
| 6,432,544 B1 | 8/2002 | Stewart et al. |
| 6,474,695 B1 | 11/2002 | Schneider et al. |
| 6,506,488 B1 | 1/2003 | Stewart et al. |
| 6,589,452 B2 | 7/2003 | Asher et al. |
| 6,602,603 B2 | 8/2003 | Welch et al. |
| 7,256,921 B2 * | 8/2007 | Kumar ................ C07D 311/94 359/241 |
| 7,320,826 B2 | 1/2008 | Kumar et al. |
| 7,410,691 B2 | 8/2008 | Blackburn et al. |
| 7,465,414 B2 * | 12/2008 | Knox ...................... B32B 27/08 252/586 |
| 7,879,391 B2 * | 2/2011 | Stamper ................ B29D 30/38 152/533 |
| 7,884,992 B1 | 2/2011 | Wang et al. |
| 7,911,676 B2 * | 3/2011 | Knowles ................ G02B 5/23 359/288 |
| 8,077,373 B2 * | 12/2011 | Kumar .................... C09B 57/00 359/241 |
| 8,147,725 B2 * | 4/2012 | Chopra ................ C07D 311/78 252/582 |
| 8,345,342 B2 | 1/2013 | Rossini et al. |
| 8,427,742 B2 | 4/2013 | Kim et al. |
| 8,518,305 B2 * | 8/2013 | Tomasulo ................ C09K 9/02 252/586 |
| 8,545,015 B2 * | 10/2013 | Kumar .................... C09B 57/00 351/159.61 |
| 8,547,625 B2 * | 10/2013 | Knowles ................ G02B 5/23 359/288 |
| 8,582,192 B2 | 11/2013 | Kumar et al. |
| 8,608,988 B2 | 12/2013 | Bowles et al. |
| 8,647,538 B2 * | 2/2014 | Lu ............................ C09K 9/02 252/582 |
| 8,649,081 B1 | 2/2014 | DeMeio et al. |
| 8,920,928 B2 * | 12/2014 | He ........................ C07D 311/94 428/411.1 |
| 9,028,728 B2 * | 5/2015 | Bancroft ............. C07D 311/94 252/582 |
| 9,310,541 B2 | 4/2016 | Gross et al. |
| 2002/0142248 A1 | 10/2002 | Dubois et al. |
| 2003/0174560 A1 | 9/2003 | Dahmen et al. |
| 2010/0118376 A1 | 5/2010 | Kwon et al. |

* cited by examiner

MULTILAYER PHOTOCHROMIC ARTICLES

CROSS REFERENCE TO RELATED APPLICATION

This application is the United States national phase of International Application No. PCT/US2015/048255 filed Sep. 3, 2015, the disclosure of which is hereby incorporated in its entirety by reference.

FIELD OF THE INVENTION

The present invention relates to multilayer photochromic articles that include a photochromic substrate, which may include a first photochromic layer defining a surface of the substrate, and a second photochromic layer positioned between the surface of the photochromic substrate and a source of actinic radiation, and in which the photochromic substrate and the second photochromic layer are selected such that the fade half-life of the photochromic substrate or the half-life of the first photochromic layer defining the surface of the substrate are greater than the fade half-life of the second photochromic layer.

BACKGROUND OF THE INVENTION

Photochromic materials are generally capable of converting from a first state, for example a "bleached state," to a second state, for example a "darkened state," in response to exposure to actinic radiation, and reverting back to the first state when exposure to the actinic radiation is discontinued or reduced. Thus, photochromic materials are used in photochromic articles, such as optical articles, to provide a reversible change in color when exposed to actinic radiation that includes ultraviolet (UV) light. Examples of such optical articles are sunglasses, vision correcting ophthalmic lenses, non-prescription and prescription lenses, sport masks, face shields, goggles, visors camera lenses, windows, and automotive windshields.

A combination of photochromic materials can be incorporated into a single layer of a photochromic article for purposes such as obtaining a desired color when activated. The photochromic performance, e.g., optical density and/or fade half-life, of such photochromic articles can, however, be less than optimal.

It would be desirable to develop new photochromic articles that include a combination of photochromic compounds, which provide improved photochromic performance.

SUMMARY OF THE INVENTION

The present invention is directed to a photochromic article. The photochromic article includes: (a) a photochromic substrate having a fade half-life-A ($T_{1/2}$-A) and (b) a photochromic layer having a fade half-life-B ($T_{1/2}$-B). In the photochromic article of the present invention, the photochromic layer (b) is positioned between a first surface of the photochromic substrate and a source of actinic radiation and the fade half-life of the photochromic substrate (a), $T_{1/2}$-A, is greater than the fade half-life of the photochromic layer (b), $T_{1/2}$-B.

The present invention is also directed to a photochromic article that includes: (a) a photochromic substrate, wherein the photochromic substrate comprises a first surface defined by a first photochromic layer having a fade half-life-A ($T_{1/2}$-A). The photochromic article of the present invention further includes: (b) a second photochromic layer having a fade half-life-B ($T_{1/2}$-B). In the photochromic article of the present invention, the photochromic layer (b) is positioned between the first photochromic layer and a source of actinic radiation and the fade half-life of the first photochromic layer (a), $T_{1/2}$-A, is greater than the fade half-life of the photochromic layer (b), $T_{1/2}$-B.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting features of the invention are illustrated and described.

DESCRIPTION OF THE INVENTION

Figure 1:
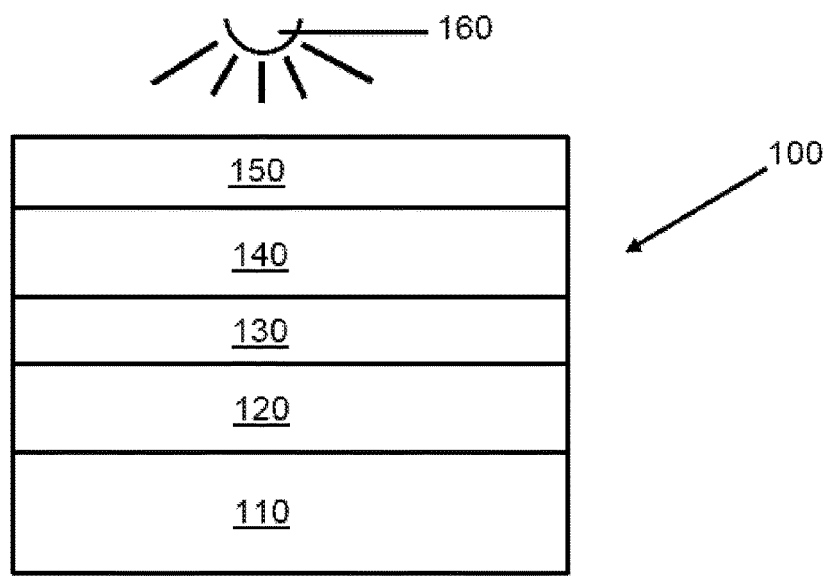
FIG. 1 depicts schematically a sectional view (not to scale) of the photochromic article of Example 5.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims, are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Unless otherwise indicated, all ranges or ratios disclosed herein are to be understood to encompass any and all sub-ranges or sub-ratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a," "an," and "the" include plural referents unless otherwise expressly and unequivocally limited to one referent.

In this application, the term "actinic radiation" means electromagnetic radiation that is capable of causing a response in a material, such as, but not limited to, transforming a photochromic material from one form or state to another as will be discussed in further detail herein.

The term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

The term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state" or "bleached state," to a second state, for example a "colored state" or "darkened state," in response to actinic radiation, and reverting back to the first state in response to thermal energy. The term "non-thermally reversible photochromic compounds/materials" as used herein means compounds/materials capable of converting from a first state, for example a "clear state" or "bleached state," to a second state, for example a "colored state" or "darkened state," in response to actinic radiation, and reverting back to the first state in response to actinic radiation of substantially the same wavelength(s) as the absorption(s) of the colored state (e.g., discontinuing exposure to such actinic radiation).

The term "ΔOD" and equivalent recitations, such as "delta OD," means change in optical density (OD) from the bleached state to the darkened state and is determined by calculating the change in optical density according to the following formula:

$$\Delta OD = \log(\% Tb / \% Ta)$$

In the above formula, % Tb is the percent transmittance in the bleached state (or non-colored state), % Ta is the percent transmittance in the activated state (or colored state) and the logarithm is to the base 10. Optical density measurements are made at the photopic (Phot) wavelength or at specific wavelengths. Determination of ΔOD is described in further detail in the examples herein.

The term "fade half-life" ($T_{1/2}$) is the time interval in seconds for the ΔOD of the test samples, after saturation or near-saturation is achieved, to reach one half the ΔOD measured after removal of the activating light source at a given temperature.

The term "state" and the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting features disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

The term "optical" means pertaining to or associated with light and/or vision. For example, according to various non-limiting features disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

The term "layer" means a film, which may be derived from a flowable composition including coatings and curable compositions, and/or a sheet, which may be a polymeric sheet and which may be layered in laminated sheets, and/or a combination of films and sheets. A layer that includes one or more photochromic compounds of the present invention can, in some features of the invention, be a photochromic coating layer or define a surface of a substrate.

The term "sheet" means a pre-formed film having a generally uniform thickness and capable of self-support.

The term "connected to" means in direct contact with an object or indirect contact with an object through one or more other structures or materials, at least one of which is in direct contact with the object. For purposes of non-limiting illustration, a layer containing one or more photochromic materials/compounds of the present invention, for example, can be in direct contact (e.g., abutting contact) with at least a portion of a substrate, such as an optical article, or it can be in indirect contact with at least a portion of the substrate through one or more other interposed structures or materials, such as a monomolecular layer of a coupling or adhesive agent. For example, although not limiting herein, a layer containing one or more photochromic materials/compounds of the present invention, can be in contact with one or more other interposed layers, coatings, polymer sheets or combinations thereof, at least one of which is in direct contact with at least a portion of the substrate.

The terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

The spatial or directional terms, such as "left," "right," "inner," "outer," "above," "below," and the like, relate to the invention described herein. However, it is to be understood that the invention can assume various alternative orientations and, accordingly, such terms are not to be considered as limiting.

The term "by a factor of" means multiplied by, for example, $T_{1/2}$-A is greater than $T_{1/2}$-B, by a factor of at least 1.5 means $T_{1/2}$-A is greater than ($T_{1/2}$-B×1.5).

The term "compound" means a substance formed by the union of two or more elements, components, ingredients, or parts and includes, without limitation, molecules and macromolecules (for example polymers and oligomers) formed by the union of two or more elements, components, ingredients, or parts.

The term "substrate" means an article having at least one surface that is capable of accommodating a photochromic layer. The substrate has a surface to which a photochromic layer can be applied or a surface of the substrate can be photochromic layer itself. The shape the surface of the substrate can include round, flat, cylindrical, spherical, planar, substantially planar, plano-concave and/or plano-convex, curved, including, but not limited to, convex and/or concave.

The term "polymer" means homopolymers (e.g., prepared from a single monomer species), copolymers (e.g., prepared from at least two monomer species), and graft polymers.

The term "poly(meth)acrylate" and similar terms, such as "(meth)acrylic acid ester" means methacrylates and/or acrylates. As used herein, the term "(meth)acrylic acid" means methacrylic acid and/or acrylic acid.

In this application, the molecular weight values of polymers, such as weight average molecular weights (Mw) and number average molecular weights (Mn), are determined by gel permeation chromatography using appropriate standards, such as polystyrene standards, and glass transitions temperatures (Tg) are determined using differential scanning calorimetry (DSC) or dynamic mechanical analysis (DMA).

In this application, the polydispersity index (PDI) values represent a ratio of the weight average molecular weight (Mw) to the number average molecular weight (Mn) of the polymer (i.e., Mw/Mn).

As previously noted, the present invention is directed to a photochromic article. The photochromic article includes: (a) a photochromic substrate having a fade half-life-A ($T_{1/2}$-A) and (b) a photochromic layer having a fade half-life-B ($T_{1/2}$-B). In the photochromic article of the present invention, the photochromic layer (b) is positioned between a first surface of the photochromic substrate and a source of actinic radiation and the fade half-life of the photochromic substrate (a), $T_{1/2}$-A, is greater than the fade half-life of the photochromic layer (b), $T_{1/2}$-B.

In some features of the invention, the photochromic article includes: (a) a photochromic substrate having a fade half-life-A ($T_{1/2}$-A); and (b) a photochromic layer having a fade half-life-B ($T_{1/2}$-B) and being positioned between a first surface of the photochromic substrate and a source of actinic radiation, wherein the $T_{1/2}$-A is greater than the $T_{1/2}$-B by a factor of 1.5, the $T_{1/2}$-A and the $T_{1/2}$-B each being measured at 23° C.

The present invention is also directed to a photochromic article that includes: (a) a photochromic substrate, wherein the photochromic substrate comprises a first surface defined by a first photochromic layer having a fade half-life-A ($T_{1/2}$-A). The photochromic article of the present invention further includes: (b) a second photochromic layer having a fade half-life-B ($T_{1/2}$-B). In the photochromic article of the present invention, the photochromic layer (b) is positioned between the first photochromic layer and a source of actinic radiation and the fade half-life of the first photochromic layer (a), $T_{1/2}$-A, is greater than the fade half-life of the photochromic layer (b), $T_{1/2}$-B.

In some features of the invention, the photochromic article includes: (a) a photochromic substrate, wherein the photochromic substrate comprises a first surface defined by a first photochromic layer having a fade half-life-A ($T_{1/2}$-A); and (b) a second photochromic layer having a fade half-life-B ($T_{1/2}$-B) and being positioned between the first photochromic layer and a source of actinic radiation, wherein the $T_{1/2}$-A is greater than the $T_{1/2}$-B by a factor of 1.5, the $T_{1/2}$-A and the $T_{1/2}$-B each being measured at 23° C.

In some features of the invention, the photochromic substrate can include at least one photochromic compound. The photochromic layer can include at least one photochromic compound.

The photochromic compounds can be selected from inorganic, organometallic and/or organic photochromic compounds. When two or more photochromic compounds are used in combination, they are generally chosen to complement one another to produce a desired color or hue.

In some features of the invention, the photochromic substrate having at least one photochromic compound and the photochromic layer having at least one photochromic compound each independently have a hue that is the same or different relative to each other. In some features of the invention, the photochromic substrate having a fade half-life-A ($T_{1/2}$-A) and the photochromic layer having a fade half-life-B ($T_{1/2}$-B) each independently have a hue that is the same or different relative to each other.

In some features of the invention, the first layer defining a first surface of the photochromic substrate having at least one photochromic compound and the second photochromic layer having at least one photochromic compound each independently have a hue that is the same or different relative to each other. In some features of the invention, the first layer defining a first surface of the photochromic substrate having a fade half-life-A ($T_{1/2}$-A) and the second photochromic layer having a fade half-life-B ($T_{1/2}$-B) each independently have a hue that is the same or different relative to each other.

Non-limiting examples of organic photochromic compounds include benzopyrans, naphthopyrans (for example naphtho[1,2-b]pyrans and naphtho[2,1-b]pyrans) spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spirooxazines. Other non-limiting examples of photochromic compounds that may be used include: fulgides and fulgimides, for example 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application No. 2003/0174560 from paragraph [0025] to [0086], which disclosure is incorporated herein by reference; and combinations or mixtures of any of the aforementioned photochromic materials/compounds.

Further non-limiting examples of organic photochromic compounds, polymerizable photochromic compounds and complementary photochromic compounds are described in the following U.S. Patents: U.S. Pat. No. 5,166,345 at column 3, line 36 to column 14, line 3; U.S. Pat. No. 5,236,958 at column 1, line 45 to column 6, line 65; U.S. Pat. No. 5,252,742 at column 1, line 45 to column 6, line 65; U.S.

Pat. No. 5,359,085 at column 5, line 25 to column 19, line 55; U.S. Pat. No. 5,488,119 at column 1, line 29 to column 7, line 65; U.S. Pat. No. 5,821,287 at column 3, line 5 to column 11, line 39; U.S. Pat. No. 6,113,814 at column 2, line 23 to column 23, line 29; U.S. Pat. No. 6,153,126 at column 2, line 18 to column 8, line 60; U.S. Pat. No. 6,296,785 at column 2 line 47 to column 31, line 5; U.S. Pat. No. 6,348,604 at column 3, line 26 to column 17, line 15; and U.S. Pat. No. 6,353,102 at column 1, line 62 to column 11, line 64, which disclosures are incorporated herein by reference. The photochromic composition may contain one photochromic compound or a mixture of two or more photochromic compounds, as desired. Mixtures of photochromic compounds can be used to attain certain activated colors, such as a near neutral gray or near neutral brown. See, for example, U.S. Pat. No. 5,645,767, column 12, line 66 to column 13, line 19, which describes the parameters that define neutral gray and brown colors. Such disclosure is incorporated herein by reference.

In some features of the invention, the photochromic article further includes an interposed layer, wherein the interposed layer is interposed between the surface of a photochromic substrate and a photochromic layer or between a first and a second photochromic layers. The interposed layer is of a thickness at least sufficient to prevent migration of the at least one photochromic compounds from the photochromic substrate to the photochromic layer and from the photochromic layer to the photochromic substrate. The interposed layer is of a thickness at least sufficient to prevent migration of the one or more photochromic compounds from the first photochromic layer to the second photochromic layer and from the second photochromic layer to the first photochromic layer. A "sufficient" thickness means a thickness of from about 1 nm to about 50 micrometers. The interposed layer may be derived from a flowable composition or from a film, such as, but not limited to, a polyvinyl alcohol film. Non-limiting examples of the interposed layer include commercial hard coat products such as SILVUE® 124 and HI-GARD® coating, available from SDC Coatings, Inc. and PPG Industries, Inc., respectively, organofunctional silanes, vapor-deposited metal oxides such as, but not limited to, $SiO_2$ or $AlO_3$, polyvinyl alcohol, ethylene-vinyl alcohol co-polymers, polyacrylonitrile, polyvinylidene chloride, or polyurethane dispersions such as Mistui Chemicals TAKELAC™ WPB-341.

The multilayer photochromic articles of the present invention can include one or more photochromic materials within the substrate and/or one or more photochromic materials in one or more layers, one or more coating layers, one or more films, and/or one or more sheets applied over the substrate.

In some features of the invention, one or more of the photochromic materials can be: incorporated, such as dissolved and/or dispersed, into the substrate, such as by imbibition, permeation or other transfer methods; polymerized with other components from which the substrate is prepared, such as with reaction injection molding; incorporated or mixed with other components from which the substrate is prepared, such as with injection molding of thermoplastic materials; and/or incorporated into an at least partial coating or film applied to a substrate, such as an at least partially cured polymeric coating or a film applied to one surface of the substrate. The term "imbibition" or "imbibe" is intended to mean and/or include permeation of the photochromic materials individually or with other non-photochromic materials into a polymerizate, solvent assisted transfer absorption of the photochromic materials into a polymerizate, vapor phase transfer, and other such transfer mechanisms.

In some features of the invention, the substrate includes at least one photochromic material (A1). In some features of the invention, the substrate further comprises at least one photochromic material (B1) that is different from photochromic material (A1).

In some features of the invention, the photochromic article of the present invention further includes a layer that has an at least partially cured polymer matrix, applied to at least one surface of the substrate. In some features of the invention, the at least partially cured polymeric layer includes one or more photochromic materials (A2). In some features of the invention, the layer further includes at least one other photochromic material (B2) that is different from photochromic material (A2).

Non-limiting examples of suitable substrates include, paper, glass, ceramics, wood, masonry, textiles, metals, and polymeric organic host materials. The multilayer photochromic articles of the present invention are particularly useful when using optical substrates, such as optical substrates made from glass, minerals, ceramics, and metal.

Polymeric substrates that may be used in preparing the photochromic articles of the present invention include organic polymeric materials and inorganic materials, such as glass. As used herein, the term "glass" is defined as being a polymeric substance, for example a polymeric silicate. The glass substrate can be a clear, low colored, transparent glass such as the well-known silica type glass, particularly soda-lime-silica glass. The nature and composition of various silica glasses are well known in the art. The glass may be strengthened by either thermal or chemical tempering.

Non-limiting examples of polymeric organic substrates include plastic materials that are chemically compatible with the photochromic layer applied to the surface of the substrate. The polymeric organic substrate may be prepared from art-recognized polymers that are useful as optical substrates, such as organic optical resins that are used to prepare optically clear castings for optical applications, such as ophthalmic lenses.

In some features of the invention, the amount of photochromic material(s) incorporated into a polymeric host material, such as the substrate and/or layers, can vary widely. Typically, a sufficient amount is used to produce a photochromic effect discernible to the naked eye upon activation. Generally, such amount can be described as a photochromic amount. The particular amount used depends often upon the intensity of color desired upon irradiation thereof and upon the method used to incorporate the photochromic materials. Typically, in some non-limiting features of the invention, the more photochromic material incorporated, the greater is the color intensity up to a certain limit. There is a point after which the addition of any more material will not have a noticeable effect, although more material can be added, if desired.

The relative amounts of the photochromic materials or combinations of photochromic materials used in the substrate and/or layers will vary and depend in part upon the relative intensities of the color of the activated species of such materials, the ultimate color desired, the retained coloration desired and the method of application to the host material and/or substrate. In some non-limiting features of the invention, the amount of total photochromic material incorporated by imbibition into a photochromic optical host material can vary widely. In some non-limiting features of the invention, the amount can range from about 0.01 to about 2.0, or from 0.05 to about 1.0, milligrams per square centimeter of surface to which the photochromic material is incorporated or applied. The amount of total photochromic material incorporated or applied to the host material can range between any combinations of these values, inclusive of the recited range, e.g., 0.015 to 1.999 milligrams per square centimeter.

In some features of the invention, the total amount of photochromic material incorporated into a polymerizable composition for forming a layer, coating, film, or polymerizate can vary widely. In some features, the amount incorporated can range from 0.01 to 40 weight percent based on the weight of the solids in the polymerizable composition. The amount of photochromic material(s) in the layer can range between any combinations of these values, inclusive of the recited range, such as from 0.011 to 39.99 weight percent.

The various photochromic layer compositions described below are well known and are made with components and according to methods well understood and appreciated to those skilled in the art. Suitable substrates for the application of layers containing the photochromic materials of the present invention or a mixture of the photochromic materials of the present invention and other optional photochromic materials including any type of substrate. Non-limiting examples include, paper, glass, ceramics, wood, masonry, textiles, metals and organic polymeric materials as host materials.

Photochromic polyurethane layer compositions that can be used to prepare the multilayer photochromic articles of the present invention, with some non-limiting features, can be produced by the catalyzed or uncatalyzed reaction of an organic polyol component and an isocyanate component in the presence of photochromic compound(s). Materials and methods for the preparation of polyurethanes are described in Ullmann's Encyclopedia of Industrial Chemistry, Fifth Edition, 1992, Vol. A21, pages 665 to 716. Non-limiting examples of methods and materials, e.g., organic polyols, isocyanates and other components, which can be used to prepare the polyurethane layer are disclosed in U.S. Pat. Nos. 4,889,413 and 6,187,444.

Photochromic aminoplast resin layer compositions that can be used to produce the multilayer photochromic articles of the present invention, with some non-limiting features, can be prepared by combining a photochromic material with the reaction product of a functional component(s) having at least two functional groups chosen from hydroxyl, carbamate, urea or a mixture thereof and an aminoplast resin, e.g., crosslinking agent as described in U.S. Pat. Nos. 4,756,973, 6,432,544 and 6,506,488.

Photochromic polysilane layer compositions contemplated for use in preparing the multilayer photochromic articles of the present invention, with some non-limiting features, are prepared by hydrolyzing at least one silane monomer such as glycidoxypropyltrimethoxysilane, vinyltrimethoxysilane, methacryloxypropyltrimethoxysilane, tetramethoxysilane, tetraethoxysilane and/or methyltrimethoxysilane and combining the hydrolyzate with at least one photochromic material as described in U.S. Pat. No. 4,556,605.

Photochromic poly(meth)acrylate layer compositions contemplated for use in preparing the multilayer photochromic articles of the present invention can be prepared, with some non-limiting features, by combining photochromic compound(s) with mono-, di- or multi-functional (meth) acrylates as described in U.S. Pat. Nos. 6,025,026 and 6,150,430 and WO publication 01/02449 A2.

Polyanhydride photochromic layer compositions that can be used to prepare the multilayer photochromic articles of the present invention can be prepared with some non-limiting features, by the reaction of a hydroxyl-functional component and a polymeric anhydride-functional component in a composition including at least one organic photochromic material as described in U.S. Pat. No. 6,432,544B1. Non-limiting examples of hydroxyl-functional components, anhydride-functional component(s) and other components that can be used to prepare the polyanhydride photochromic layers are disclosed in U.S. Pat. Nos. 4,798,745, 4,798,746 and 5,239,012.

Photochromic polyacrylamide layer compositions contemplated for use in preparing the multilayer photochromic articles of the present invention, with some non-limiting features, can be prepared by combining a photochromic component with the free radical initiated reaction product of a polymerizable ethylenically unsaturated composition comprising N-alkoxymethyl(meth)acrylamide and at least one other copolymerizable ethylenically unsaturated monomer as described in U.S. Pat. No. 6,060,001. Methods for preparing N-alkoxymethyl(meth)acrylamide functional polymer are described in U.S. Pat. No. 5,618,586.

Photochromic epoxy resin layer compositions that can be used to prepare the multilayer photochromic articles of the present invention, in some non-limiting aspects, can be prepared by combining photochromic compound(s), epoxy resins or polyepoxides and curing agents as described in U.S. Pat. Nos. 4,756,973 and 6,268,055B1.

Photochromic polyurethane and polyisocyanurate layers compositions that can be used to prepare the multilayer photochromic articles of the present invention, with some non-limiting features, the compositions include both urethane linkages and isocyanurate linkages.

In some non-limiting features of the invention, the types of photochromic polymeric layers including the film-forming polymers and the photochromic materials of the present invention include paints, e.g., a pigmented liquid or paste used for the decoration, protection and/or the identification of a substrate; and inks, e.g., a pigmented liquid or paste used for writing and printing on substrates such as in producing verification marks on security documents, e.g., documents such as banknotes, passports, and drivers' licenses, for which authentication or verification of authenticity may be desired.

Application of the polymeric layers can be by any of the methods used in coating technology, non-limiting examples include, spray coating, spin coating, spin and spray coating, spread coating, curtain coating, dip coating, casting or roll-coating and methods used in preparing overlays, such as the method of the type described in U.S. Pat. No. 4,873,029. The application method selected also depends, is some aspects, on the thickness of the desired layers.

The thickness of the layers on/of the photochromic articles of the present invention can vary widely. Layers having a thickness ranging from 1 to 50 microns can be applied by the methods used in coating technology. Layers of a thickness greater than 50 microns can require the application of multiple coating layers or molding methods typically used for overlays. In some non-limiting features, the layer can range in thickness from 1 to 10,000 microns, or from 5 to 1000, or from 8 to 400, or from 10 to 250 microns. The thickness of the polymeric layer can range between any combinations of these values, inclusive of the recited range, such as a thickness of from 20 to 200 microns.

Following application of the polymeric layer composition to a surface of the substrate, in some non-limiting features, the layer composition is at least partially cured. In some further non-limiting features, the methods used for curing the photochromic polymeric layer include the methods used for forming an at least partially cured polymer. Such methods include radical polymerization, thermal polymerization, photopolymerization or a combination thereof. Additional non-limiting methods include irradiating the coated substrate or at least partially cured polymer with infrared, ultraviolet, gamma or electron radiation so as to initiate the polymerization reaction of the polymerizable components. This can be followed by a heating step.

In some non-limiting features, if required and if appropriate, the surface of the substrate is cleaned prior to applying the photochromic polymeric layer to produce the multilayer photochromic article of the present invention. This can be done for the purposes of cleaning and/or promoting adhesion of the photochromic layer. Effective treatment techniques for plastics and glass are known to those skilled in the art.

In some non-limiting features, it may be necessary to apply a primer to the surface of the substrate before application of the photochromic polymeric layer. The primer can serve as a barrier layer to prevent interaction of the layer ingredients with the substrate and/or vice versa, and/or as an adhesive layer to adhere the photochromic polymeric layer to the substrate. Application of the primer can be by any of the methods used in coating technology such as, for example, spray coating, spin coating, spin and spray coating, spread coating, dip coating, casting or roll-coating.

The use of protective layers or coating layers, some of which can contain polymer-forming organosilanes, as primers to improve adhesion of subsequently applied coating layers has been described in U.S. Pat. No. 6,150,430, which disclosure is incorporated herein by reference. In some non-limiting aspects, non-tintable coating layers are used. Non-limiting examples of commercial coating products include SILVUE® 124 and HI-GARD® coating, available from SDC Coatings, Inc. and PPG Industries, Inc., respectively. In addition, depending on the intended use of the multilayer article, in some non-limiting features, it can be necessary to apply an appropriate protective layer(s), such as an abrasion resistant layer and/or layers that can serve as oxygen barriers, onto the exposed surface of the layer composition to prevent scratches from the effects of friction and abrasion and interactions of oxygen with the photochromic materials, respectively.

In some non-limiting features, the primer and protective layers are interchangeable, in which case the same layer composition can be used as the primer and the protective layer(s). Non-limiting examples of hardcoats include those based on inorganic materials such as silica, titania and/or zirconia as well as organic hardcoats of the type that are ultraviolet light curable.

In some non-limiting features, such protective layers can be applied to the surface of multilayer photochromic articles including at least partially cured polymers containing photochromic materials.

In some non-limiting features, the multilayer photochromic article of the present invention includes a substrate to which a primer is applied followed by the photochromic polymeric layer and a protective hardcoat. In further non-limiting aspects, the protective hardcoat is an organosilane hardcoat.

In some additional non-limiting features, other layers or surface treatments, such as a tintable layer, antireflective surface, etc., can also be applied to the multilayer photochromic articles of the present invention. An antireflective layer, such as a monolayer or multilayer of metal oxides, metal fluorides, or other such materials, can be deposited onto the photochromic articles, e.g., lenses, of the present invention through vacuum evaporation, sputtering, or some other method.

In further non-limiting features, the multilayer photochromic article that includes an at least partially cured polymer and at least one photochromic material further includes a superstrate, e.g., a film or sheet comprising at least one organic polymeric material. The photochromic material can be located in the superstrate, the at least partially cured polymer or both. The organic polymeric material of the superstrate is the same as the organic polymeric material described above as the substrate or host material. Non-limiting examples of the organic polymeric materials include thermosetting or thermoplastic materials, for example a thermoplastic polyurethane superstrate.

In still further non-limiting features, the superstrate can be connected to the polymer surface directly, but does not become thermally fused to the substrate. In other non-limiting features, the superstrate can be adheringly bonded to the substrate by becoming thermally fused with the subsurface of the substrate. General conditions under which superstrates are adheringly bonded to a substrate are known to those skilled in the art. Non-limiting conditions for adheringly laminating a superstrate to a substrate include heating to a temperature of from 250-350° F. (121-177° C.) and applying pressure of from 150 to 400 pounds per square inch (psi) (1034 to 2758 kPa). Sub-atmospheric pressures, e.g., a vacuum, can also be applied to draw down and conform the superstrate to the shape of the substrate as known to those skilled in the art. Non-limiting examples include applying at a sub-atmospheric pressure within the range of from 0.001 mm Hg to 20 mm Hg (0.13 Pa to 2.7 kPa).

After a laminate that includes a superstrate applied to at least one surface of a substrate is formed, it can further include a protective layer, coating, or film superposed onto the superstrate. Such a protective layer, coating, or film, in some non-limiting features, serves as an at least partially abrasion resistant layer, coating, or film. Non-limiting types of protective layers include the aforedescribed hardcoats that are curable by ultraviolet radiation and/or that contain organosilanes. The thickness of the protective layer can vary widely and include the aforementioned range for the photochromic polymeric layers. Non-limiting types of protective films include those made of organic polymeric materials such as thermosetting and thermoplastic materials. In another non-limiting feature, the protective film is a thermoplastic film made of polycarbonate. The thickness of the protective film or sheet can vary widely. Typically, such films have a thickness of from 1 to 20 mils (0.025 to 0.5 mm).

The host material, such as the substrate, of the photochromic material(s) is usually transparent, but may be translucent or even opaque. The host material need only be pervious to that portion of the electromagnetic spectrum, which activates the photochromic material, e.g., that wavelength of ultraviolet (UV) light that produces the open or colored form of the photochromic and that portion of the visible spectrum that includes the absorption maximum wavelength of the photochromic in its UV activated form, e.g., the open form. In one contemplated non-limiting feature of the invention, the host color should not be such that it masks the color of the activated form of the photochromic materials, e.g., so the change in color is readily apparent to the observer. Compatible tints may be applied to the host material as described in U.S. Pat. No. 5,645,767 in column 13, line 59 to column 14, line 3.

In some non-limiting features, the polymeric organic host material can be a solid transparent or optically clear material, e.g., materials having a luminous transmittance of at least 70 percent and are suitable for optical applications, such as optical elements chosen from plano and ophthalmic lenses, ocular devices such as ophthalmic devices that physically reside in or on the eye, e.g., contact lenses and intraocular lenses, windows, automotive transparencies, e.g., windshields, aircraft transparencies, plastic sheeting, polymeric films, etc.

In some features of the present invention, the substrate of the photochromic article is an optical element. In some further features, the optical element is an ophthalmic lens.

Non-limiting examples of polymeric organic materials which can be used as a host material for the photochromic material(s) of the present invention or as a substrate for a photochromic polymeric layer include: poly(meth)acrylates, polyurethanes, polythiourethanes, thermoplastic polycarbonates, polyesters, poly(ethylene terephthalate), polystyrene, poly(alpha methylstyrene), copoly(styrene-methyl methacrylate), copoly(styrene-acrylonitrile), polyvinylbutyral, poly(vinyl acetate), cellulose acetate, cellulose propionate, cellulose butyrate, cellulose acetate butyrate, polystyrene or polymers, such as homopolymers and copolymers prepared by polymerizing monomers chosen from bis(allyl carbonate) monomers, styrene monomers, diisopropenyl benzene monomers, vinylbenzene monomers, e.g., those described in U.S. Pat. No. 5,475,074, diallylidene pentaerythritol monomers, polyol (allyl carbonate) monomers, e.g., diethylene glycol bis(allyl carbonate), vinyl acetate monomers, acrylonitrile monomers, mono- or polyfunctional, e.g., di- or multi-functional, (meth)acrylate monomers such as ($C_1$-$C_{12}$)alkyl (meth)acrylates, e.g., methyl (meth)acrylate, ethyl (meth)acrylate, butyl (meth)acrylate etc., poly(oxyalkylene)(meth)acrylate, poly(alkoxylated phenol (meth)acrylates), diethylene glycol (meth)acrylates, ethoxylated bisphenol A (meth)acrylates, ethylene glycol (meth)acrylates, poly(ethylene glycol) (meth)acrylates, ethoxylated phenol (meth)acrylates, alkoxylated polyhydric alcohol (meth)acrylates, e.g., ethoxylated trimethylol propane triacrylate monomers, urethane (meth)acrylate monomers, such as those described in U.S. Pat. No. 5,373,033, or a mixture thereof. Further examples of polymeric organic host materials are disclosed in the U.S. Pat. No. 5,753,146, column 8, line 62 to column 10, line 34.

In some features, the substrate of the multilayer photochromic article of the present invention is an organic polymeric material, and the organic polymeric material is chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral or is polymerized from monomers chosen from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers or mixtures thereof.

In some further non-limiting features, transparent copolymers and blends of transparent polymers are also suitable as polymeric materials. The host material can be an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483.

In accordance with some further non-limiting features, the photochromic material(s) of the present invention are used with optical organic resin monomers to produce optically clear layers, coatings, films and polymerizates, e.g., materials suitable for optical applications, such as for example plano and ophthalmic lenses, windows, and automotive transparencies. Examples of non-limiting features include polymerizates of optical resins sold by PPG Industries, Inc. as TRIVEX monomers and under the CR-designation, e.g., CR-307, CR-407 and CR-607 and the resins used to prepare hard or soft contact lenses. Methods for producing both types of contact lenses are disclosed in U.S. Pat. No. 5,166,345, column 11, line 52, to column 12, line 52.

Further non-limiting features of optical resins include the resins used to form soft contact lenses with high moisture content described in U.S. Pat. No. 5,965,630 and extended wear contact lenses described in U.S. Pat. No. 5,965,631.

The present invention is more particularly described in the following examples, which are intended as illustrative only, since numerous modifications and variations therein will be apparent to those skilled in the art. It was found that the multilayer photochromic articles described herein provide improved photochromic performance when compared to blends or mixtures of photochromic materials in a single layer of a photochromic article. Additionally, the multilayer photochromic articles of the present invention can be used without altering the hardness of the matrix containing the photochromic compounds.

The multilayer photochromic articles of the present invention can be used in, as, or in conjunction with various applications including, but not limited to, optical lenses, such as vision correcting ophthalmic lenses, sunlenses, plano lenses, face shields, goggles, visors, camera lenses, windows, automotive windshields, aircraft and automotive transparencies, helmets, clear films, polymeric coatings, plastic films and sheets, textiles, and the like.

Further, the multilayer photochromic articles of the present invention may be used in association with plastic or glass films and sheets, optical devices, e.g., optical switches, display devices and memory storage devices, such as those described in U.S. Pat. No. 6,589,452, and security elements, such as optically-readable data media, e.g., those described in U.S. Patent Application No. 2002/0142248, security elements in the form of threads or strips, as described in U.S. Pat. No. 6,474,695, and security elements in the form of verification marks that can be placed on security documents and articles of manufacture.

The following examples are presented to demonstrate the general principles of the invention. The invention should not be considered as limited to the specific examples presented. All parts and percentages in the examples are by weight unless otherwise indicated.

EXAMPLES

Testing Procedures for Photochromic Articles

The coated lenses or chips (hereafter collectively referred to as lenses) prepared below were tested for photochromic performance using the Photochromic Performance Test on the Advanced Bench for Measuring Photochromics ("A-BMP") optical bench. The optical bench was maintained at a constant temperature during testing, typically 10, 23 or 35° C. as indicated for the particular sample.

Prior to testing on the optical bench, each of the coated lenses was exposed to 365-nanometer ultraviolet light for about 10 minutes at a distance of about 14 centimeters to activate the photochromic materials. The UVA (315 to 380 nm) irradiance at the lens was measured with a Goosch & Housego OL 756 spectroradiometer with OL 86-T cosine receptor and found to be 22.2 watts per square meter. The lens was then placed under a 500 watt, high intensity halogen lamp for about 10 minutes at a distance of about 36 centimeters to bleach (inactivate) the photochromic materials. The illuminance at the lens was measured with the OL 756 spectroradiometer and found to be 21.9 Klux. The lenses were then kept in a dark environment at room temperature (from 21 to 24° C.) for at least 1 hour prior to testing on the optical bench. Prior to optical bench measurement, the lenses were measured for ultraviolet absorbance at 390 nanometers.

The A-BMP optical bench was fitted with two 150-watt ORIEL® Model #66057 Xenon arc lamps at right angles to each other. The light path from Lamp 1 was directed through a 3 mm SCHOTT KG-2 band-pass filter and appropriate neutral density filters that contributed to the required UV and partial visible light irradiance level. The light path from Lamp 2 was directed through a 3 mm SCHOTT KG-2 band-pass filter, a SCHOTT GG400 short band cutoff filter and appropriate neutral density filters in order to provide supplemental visible light illuminance A 2 inch×2 inch 50% polka dot beam splitter, at 45° to each lamp is used to mix the two beams. The combination of neutral density filters and voltage control of the Xenon arc lamp were used to adjust the intensity of the irradiance. Proprietary software i.e., PTSoft version 4.4 was used on the A-BMP to control timing, irradiance, air cell and sample temperature, shuttering, filter selection and response measurement. A ZEISS® Model MCS 601 spectrophotometer, with fiber optic cables for light delivery through the lens was used for response and color measurement. Photopic response measurements were collected on each lens.

The power output of the optical bench, i.e., the dosage of light that the lens was exposed to, was adjusted to 6.7 Watts per square meter (W/m2) UVA, integrated from 315-380 nm and 50 Klux illuminance, integrated from 380-780 nm. Measurement of this power set point was made using an irradiance probe and the calibrated Zeiss spectrophotometer. The lens sample cell was fitted with a quartz window and self-centering sample holder. The temperature in the sample cell was controlled through the software with an AirJet XE custom-coupled to a bubbling water bath to deliver 50% RH air maintained at the desired temperature. Measurement of the sample's dynamic photochromic response and color measurements was made using the same Zeiss spectrophotometer, with fiber optic cables for light delivery from a tungsten halogen lamp and through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was 30° from perpendicular.

Response measurements, in terms of a change in optical density ($\Delta$OD) from the unactivated or bleached state to the activated or colored state were determined by establishing the initial unactivated transmittance, opening the shutter from the Xenon lamps and measuring the transmittance through activation at selected intervals of time. Change in optical density was determined according to the formula: $\Delta OD = \log(10)(\% \ Tb/\% \ Ta)$, where % Tb is the percent transmittance in the bleached state, % Ta is the percent transmittance in the activated state. Delta Optical density measurements were based on photopic optical density.

The $\Delta$OD at saturation was recorded after 15 minutes of activation at 23° C. and 35° C., or 30 minutes of activation at 10° C. The Fade Half-life ("$T_{1/2}$") value is the time interval in seconds for the $\Delta$OD of the activated form of the photochromic material in the coating to reach one half the $\Delta$OD recorded after 15 minutes of activation at 23° C. described above, after removal of the activating light source.

During the testing of the following Examples 5 through 8 and all of the Comparative Examples (CE), the articles to be tested were oriented such that the last coating applied faced the activation light source, with the exception of Comparative Example CE-6, which uses the same sample as Example 6 but was oriented "upside-down" relative to Example 6.

Examples 1-4

Preparation of Curable Photochromic Compositions

Curable photochromic compositions were prepared from the components listed in Table 1. All components are listed in parts per weight.

The ingredients listed in Charge 2 were combined and heated to 40-60° C. for a minimum of 30 minutes to dissolve the solids. The ingredients of Charge 2 were then added to Charge 1 in a suitable vessel and heated again to 40-60° C. for a minimum of 30 minutes to dissolve Charge 1. Charge 3 was added to the premix of Charge 1 and 2 and again heated to 40-60° C. for a minimum of 30 minutes while stirring. Charge 4 was premixed in a separate vessel, stirred for 30 minutes and then placed on a WHEATON® 348923-A Benchtop Roller, available from Wheaton Industries, Inc., for a minimum of 1 hour prior to use. Charge 4 was then added to the room temperature combination of Charges 1, 2 and 3 and the resulting mixture was placed on the Benchtop Roller for a minimum of 6 hours prior to use.

TABLE 1

|  | Ex. 1 | Ex. 2 | Ex. 3 | Ex. 4 |
|---|---|---|---|---|
| Charge 1 | | | | |
| PC Dye Blend #1 [1] | 3.90 | | 0.78 | 3.90 |
| PC Dye Blend #2 [2] | | 2.01 | 1.60 | |
| Charge 2 | | | | |
| TINUVIN ® 144[3] | 0.97 | 1.00 | 1.00 | 0.99 |
| IRGANOX ® 245[4] | 0.97 | 1.00 | 1.00 | 0.99 |
| N-methyl-2-pyrrolidone | 33.66 | 33.37 | 33.63 | 16.70 |
| Charge 3 | | | | |
| Eternacoll PH200D[5] | 28.50 | 29.42 | 29.15 | |
| Polycarbonate Diol[6] | | | | 26.10 |
| Charge 4 | | | | |
| K-KAT ® 348[7] | 0.48 | 0.50 | 0.49 | 0.49 |
| SILQUEST ® A-187[8] | 2.02 | 2.09 | 2.07 | 1.98 |
| Acrylic polyol[9] | 2.74 | 2.84 | 2.81 | 2.72 |
| TRIXENE ® BI-7960[10] | 26.72 | 27.71 | 27.43 | 46.04 |
| BYK ® 333[11] | 0.04 | 0.04 | 0.04 | 0.04 |
| TOTAL | 100.00 | 100.00 | 100.00 | 100.00 |

[1] Blend of photochromic indenofused naphthopyran dyes designed to give a gray color.
[2] Blend of photochromic indenofused naphthopyran dyes designed to give a green-gray color.
[3] Hindered amine light stabilizer, commercially available from BASF.
[4] Antioxidant commercially available from BASF.
[5] Polycarbonate diol commercially available from Ube Chemicals.
[6] Polycarbonate diol prepared following the procedure used to prepare Polycarbonate Polyol B (PP-B) in part 1 of U.S. Pat. No. 8,608,988, reduced to 60% solids in dipropylene glycol methyl ether acetate, with an OH equivalent weight of 1810 based on solid material.
[7] Catalyst available from King Industries Inc.
[8] Gamma-glycidoxypropyl trimethoxysilane, available from Osi Specialties.
[9] Made from free radical polymerization of hydroxypropyl methacrylate (40.4%), butyl methacrylate (57.6%) and acrylic acid (2.0%) with a number average molecular weight (Mn) of 5500 as determined by GPC with polystyrene standard and tetrahydrofuran eluent. Hydroxyl Equivalent weight (on solids) of 360. Material reduced to 61% solids using dipropylene glycol methyl ether acetate.
[10] Blocked hexamethylene diisocyanate available from Baxenden Chemical Co.
[11] Polyether modified dimethylpolysiloxane copolymer, available from BYK-Chemie.

Preparation and Testing of Photochromic Articles

Photochromic articles were prepared in three sets, according to the substrate used. All coating layers were applied using a spin coater under the conditions described below. Each set was tested for photochromic performance as described in detail above.

Example 5 and Comparative Examples A-D

Set 1: Polycarbonate Substrate

PDQ® protectively coated polycarbonate plano lenses having a diameter of 76 millimeters from Gentex Optics, Inc. were used as the base substrate. The room temperature lenses were treated with oxygen plasma at a flow rate of 100 milliliters (mL) per minute of oxygen at 100 watts of power for three minutes before application of each coating layer. For each sample, after plasma treatment Photochromic Layer 1 was applied by dispensing approximately 1-2 mL of the coating solution indicated in Table 2 onto the substrate and then rotated for 8 seconds at a spin speed sufficient to achieve 0.15-0.4 g of wet coating. Once Photochromic Layer 1 was applied, the lenses were placed in a 40° C. oven until all lenses were accumulated. The lenses were then transferred directly to a 125° C. forced air oven and cured for 1 hour (except CE-D, which was cured for 30 minutes). Each coated lens was subjected to the same plasma treatment described above before being coated further. Where indicated in Table 2, a layer of HI-GARD® 1080S (available from PPG Industries, Inc.) was applied by dispensing approximately 1-2 mL onto the lens, and rotating for 8 seconds at a spin speed sufficient to deposit 0.02-0.1 gm of wet coating, followed by baking for 15 minutes at 105° C. These lenses were subsequently treated with plasma as described above then coated with Photochromic Layer 2, the lenses were then placed in a 40° C. oven until all were accumulated, and then transferred to a 125° C. forced air oven and cured for 1 hour, followed by another plasma treatment. A protective coating, according to the formulation reported in Table 1 of Example 1 in U.S. Pat. No. 7,410,691, using an additional 0.5% polybutyl acrylate, was applied to all lenses by spin coating then UV cured for 48 seconds in an EyeUV oven equipped with D bulbs. Following this, each lens was further cured at 105° C. for three hours in a forced air oven. The photochromic performance results are shown in Table 2.

TABLE 2

|  | Ex. 5 | CE-A | CE-B | CE-C | CE-D |
|---|---|---|---|---|---|
| Substrate | PDQ | PDQ | PDQ | PDQ | PDQ |
| Photochromic Layer 1 | Ex. 2 | Ex. 2 | Ex. 1 | Ex. 3 | Ex. 1 |
| HIGARD 1080S | Yes | No | No | No | Yes |
| Photochromic Layer 2 | Ex. 1 | — | — | — | Ex. 2 |
| $T_{1/2}$ (s) @ 10° C. | 234 | 489 | 153 | 416 | 458 |
| $\Delta$OD @ 10° C. | 1.73 | 1.40 | 1.12 | 1.43 | 1.37 |
| $T_{1/2}$ (s) @ 23° C. | 50 | 98 | 34 | 79 | 94 |
| $\Delta$OD @ 23° C. | 1.12 | 1.04 | 0.67 | 1.04 | 1.02 |
| $T_{1/2}$ (s) @ 35° C. | 18 | 29 | 13 | 24 | 29 |
| $\Delta$OD @ 35° C. | 0.69 | 0.72 | 0.37 | 0.69 | 0.71 |

FIG. 1 depicts schematically the exemplary photochromic article of Example 5 as described above, and as tested. Photochromic article 100 is depicted as comprising a base substrate 110, photochromic layer 1, 120, HI-GARD® 1080S layer 130, photochromic layer 2, 140, and protective coating 150. Light source 160 also is depicted.

Comparative Examples CE-A and CE-B demonstrate the photochromic performance of the two layers independently in terms of $T_{1/2}$ and $\Delta$OD. Comparative Examples CE-C demonstrates the performance of an article with a single photochromic layer comprising a blend of the same dyes used in the individual layers of the other comparative examples and Example 5. Comparative Example CE-D demonstrates the effect of reversing the order of the photochromic layers on the photochromic performance. It is evident that by arranging the photochromic layers such that the "top" layer exhibits a shorter $T_{1/2}$, improvements in performance can be achieved in terms of the combination of optical density and fade rate.

Example 6 and Comparative Examples E-G

Set 2: Cast-in-Place Photochromic Substrate

A cast in place acrylic substrate "Photochromic CIP" was produced according to the following procedure: 8.7 mg of a blend of photochromic indenofused naphthopyran dyes designed to give a gray color was added to a flask containing 50 grams of a monomer blend of 4 parts ethoxylated bisphenol A dimethacrylate, 1 part poly(ethylene glycol) 600 dimethacrylate, and 0.033 weight percent 2,2'-azobis(2-methyl propionitrile) (AIBN). Each compound was dissolved into the monomer blend by stirring and gentle heating. After a clear solution was obtained, the sample was degassed in a vacuum oven for about 10 minutes at 25 torr. Using a syringe, the sample was dispensed into a flat sheet mold having an interior dimension of 6 inch (15.24 cm)×6 inch (15.24 cm)×2.2 mm+/−0.3 mm. The mold was sealed and placed in a horizontal airflow, programmable oven to ramp from 40° C. to 95° C. over a 5 hour interval, held at 95° C. for 3 hours, ramped down to 60° C. over a 2 hour interval and then held at 60° C. for 16 hours. After curing, the mold was opened, and the polymer sheet was cut into 2 inch (5.1 cm) test squares using a diamond blade saw.

Oxygen plasma treatment, as described previously, was done before application of any coating. For the lens of Example CE-F, after plasma treatment Photochromic Layer 1 was applied by dispensing approximately 1-2 mL of the coating solution indicated in Table 3 onto the substrate and then rotated for 8 seconds at a spin speed sufficient to achieve 0.15-0.4 g of wet coating. Once Photochromic Layer 1 was applied, the lens was transferred directly to a 125° C. forced air oven and cured for 1 hour, then subjected to the same plasma treatment described above before being coated further. Where indicated in Table 3, a layer of HI-GARD 1080S was applied by dispensing approximately 1-2 mL onto the lens, and rotating for 8 seconds at a spin speed sufficient to deposit 0.02-0.1 gm of wet coating, followed by baking for 15 minutes at 105° C. The lens of Example 6 was subsequently treated with plasma as described above then coated with Photochromic Layer 2. The lenses were placed in a 40° C. oven until all were accumulated and then transferred to a 125° C. forced air oven and cured for 1 hour, followed by another plasma treatment. A protective coating described above was applied to all lenses by spin coating then UV cured for 48 seconds in an EyeUV oven equipped with D bulbs. Following this, each lens was further cured at 105° C. for three hours in a forced air oven. The photochromic performance results are shown in Table 3.

TABLE 3

| | Ex. 6 | CE-E | CE-F | CE-G |
|---|---|---|---|---|
| Substrate | Photochromic CIP | Photochromic CIP | PDQ | The tested sample was the same as used in Ex. 6, but oriented "upside down" during activation |
| Photochromic Layer 1 | Photochromic CIP | Photochromic CIP | Ex. 4 | |
| HIGARD 1080S | Yes | No | Yes | |
| Photochromic Layer 2 | Ex. 4 | — | — | |
| $T_{1/2}$ (s) @ 10° C. | 209 | 1200 | 180 | 454 |
| $\Delta OD$ @ 10° C. | 1.46 | 0.60 | 1.19 | 1.11 |
| $T_{1/2}$ (s) @ 23° C. | 57 | 230 | 38 | 122 |
| $\Delta OD$ @ 23° C. | 1.04 | 0.58 | 0.73 | 0.80 |
| $T_{1/2}$ (s) @ 35° C. | 22 | 58 | 13 | 43 |
| $\Delta OD$ @ 35° C. | 0.67 | 0.50 | 0.42 | 0.61 |

Figure 2:
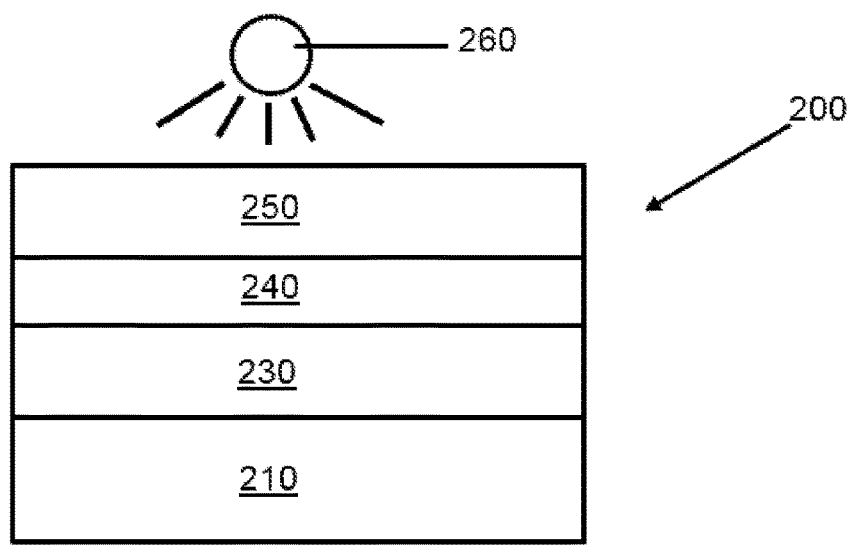
FIG. 2 depicts schematically a sectional view (not to scale) of the photochromic article of Example 6.

FIG. 2 depicts schematically the exemplary photochromic article of Example 6 as described above, and as tested. Photochromic article 200 is depicted as comprising a photochromic CIP 210, HI-GARD® 1080S layer 230, photochromic layer 2, 240, and protective coating 250. Light source 260 also is depicted.

Comparative Examples CE-E and CE-F demonstrate the photochromic performance of the two layers independently in terms of $T_{1/2}$ and $\Delta OD$. Comparative Example CE-G demonstrates the effect of reversing the order of the photochromic layers on the photochromic performance. It is evident that by arranging the photochromic layers such that the "top" layer exhibits a shorter $T_{1/2}$, improvements in performance can be achieved in terms of the combination of optical density and fade rate.

Example 7 and Comparative Example H

Set 3: Imbibed Photochromic Substrate

For Set 3, TRANSITIONS® SIGNATURE™ 7 CR607 lenses, available from Transitions Optical, Inc. were used as photochromic substrates. Oxygen plasma treatment, as described previously, was done before application of any coating. For Example 7, after plasma treatment Photochromic Layer 2 was applied by dispensing approximately 1-2 mL of the coating solution of Example 4 as indicated in Table 4 onto the substrate and then rotated for 8 seconds at a spin speed sufficient to achieve 0.15-0.4 g of wet coating. Once Photochromic Layer 2 was applied, the lenses were placed in a 40° C. oven until all were accumulated and then transferred directly to a 125° C. forced air oven and cured for 1 hour. Each lens was subjected to the same plasma treatment described above before being coated further. A protective coating described above was applied to both lenses by spin coating then UV cured for 48 seconds in an EyeUV oven equipped with D bulbs. Following this, each lens was further cured at 105° C. for three hours in a forced air oven. The photochromic performance results are shown in Table 4.

TABLE 4

| | Ex. 7 | CE-H |
|---|---|---|
| Substrate | SIGNATURE 7 | SIGNATURE 7 |
| Photochromic Layer 1 | SIGNATURE 7 | SIGNATURE 7 |
| Photochromic Layer 2 | Ex. 4 | — |
| $T_{1/2}$ (s) @ 10° C. | 183 | 596 |
| $\Delta OD$ @ 10° C. | 1.38 | 1.19 |
| $T_{1/2}$ (s) @ 23° C. | 43 | 95 |
| $\Delta OD$ @ 23° C. | 0.91 | 0.86 |
| $T_{1/2}$ (s) @ 35° C. | 15 | 26 |
| $\Delta OD$ @ 35° C. | 0.54 | 0.55 |

Comparative Examples CE-F (in Table 3) and CE-H demonstrate the photochromic performance of the two layers independently in terms of $T_{1/2}$ and $\Delta OD$. It is evident that by arranging the photochromic layers such that the "top" layer exhibits a shorter $T_{1/2}$, improvements in performance can be achieved in terms of the combination of optical density and fade rate.

The present invention is also directed to the following clauses.

Clause 1: A photochromic article comprising: (a) a photochromic substrate having a fade half-life-A ($T_{1/2}$-A); and (b) a photochromic layer having a fade half-life-B ($T_{1/2}$-B) and being positioned between a first surface of the photochromic substrate and a source of actinic radiation, wherein the $T_{1/2}$-A is greater than the $T_{1/2}$-B.

Clause 2: The photochromic article of clause 1, wherein the $T_{1/2}$-A is greater than the $T_{1/2}$-B by a factor of at least 1.5, the $T_{1/2}$-A and the $T_{1/2}$-B each being measured at 23° C.

Clause 3: The photochromic article of clauses 1 or 2, wherein the $T_{1/2}$-A is from 50 to 350 seconds, the $T_{1/2}$-A being measured at 23° C.

Clause 4: The photochromic article of any of clauses 1-3, wherein the T/2-B is from 10 to 100 seconds, the $T_{1/2}$-B being measured at 23° C.

Clause 5: The photochromic article of any of clauses 1-4, wherein the photochromic layer has a change in optical density (ΔOD) that is greater than 0.1 at photopic, the ΔOD being measured at 23° C.

Clause 6: The photochromic article of any of clauses 1-5 further comprising an interposed layer, wherein the interposed layer is interposed between the first surface of the photochromic substrate and the photochromic layer.

Clause 7: The photochromic article of any of clauses 1-6 further comprising a protective layer that is positioned over the photochromic layer.

Clause 8: The photochromic article of any of clauses 1-7, wherein the photochromic substrate comprises at least one first photochromic compound and the photochromic layer comprises at least one second photochromic compound, wherein the at least one first photochromic compound is different from the at least one second photochromic compound.

Clause 9: The photochromic article of any of clauses 1-8, wherein the at least one first photochromic compound and the at least one second photochromic compound are each independently selected from the group consisting of indeno-fused naphthopyrans, naphtho[1,2-b]pyrans, naphtho [2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Clause 10: The photochromic article of clause 8 further comprising an interposed layer, wherein the interposed layer is interposed between the first surface of the photochromic substrate and the photochromic layer, wherein the interposed layer is of a thickness at least sufficient to prevent migration of the at least one first photochromic compound into the photochromic layer, and migration of the at least one second photochromic compound into the photochromic substrate.

Clause 11: A photochromic article comprising: (a) a photochromic substrate, wherein the photochromic substrate comprises a first surface defined by a first photochromic layer having a fade half-life-A ($T_{1/2}$-A); and (b) a second photochromic layer having a fade half-life-B ($T_{1/2}$-B) and being positioned between the first photochromic layer and a source of actinic radiation, wherein the $T_{1/2}$-A is greater than the $T_{1/2}$-B.

Clause 12: The photochromic article of clause 11, wherein the $T_{1/2}$-A is greater than the $T_{1/2}$-B by a factor of at least 1.5, the $T_{1/2}$-A and the $T_{1/2}$-B each being measured at 23° C.

Clause 13: The photochromic article of clause 11 or 12, wherein the $T_{1/2}$-A is from 50 to 350 seconds, the $T_{1/2}$-A being measured at 23° C.

Clause 14: The photochromic article of any of clauses 11-13, wherein the $T_{1/2}$-B is from 10 to 100 seconds, the $T_{1/2}$-B being measured at 23° C.

Clause 15: The photochromic article of any of clauses 11-14, wherein the first photochromic layer is a first photochromic coating layer and the second photochromic layer is a second photochromic coating layer.

Clause 16: The photochromic article of any of clauses 11-15, wherein the second photochromic coating layer has a change in optical density (ΔOD) that is greater than 0.1 at photopic, the ΔOD being measured at 23° C.

Clause 17: The photochromic article of any of clauses 11-16 further comprising a protective coating layer that is positioned over the second photochromic coating layer.

Clause 18: The photochromic article of any of clauses 11-17, wherein the first photochromic coating layer and the second photochromic coating layer each independently comprise an organic matrix comprising at least one organic polymeric material.

Clause 19: The photochromic article of clause 18, wherein the organic polymeric material is chosen from polyurethanes, polyisocyanurates, polyureas, acrylates, poly(meth)acrylates, polyanhydrides, polyacrylamides, epoxy resins, melamines, and combinations thereof.

Clause 20: The photochromic article of clause 18 wherein the organic polymeric material of the first photochromic coating layer comprises polyurethane, polyisocyanurate, and combinations thereof.

Clause 21: The photochromic article of clause 18, wherein the organic polymeric material of the second photochromic coating layer comprises poly(meth)acrylate.

Clause 22: The photochromic article of any of clauses 11-21, wherein the first photochromic coating layer comprises at least one first photochromic compound and the second photochromic coating layer comprises at least one second photochromic compound, wherein the at least one first photochromic compound is different from the at least one second photochromic compound.

Clause 23: The photochromic article of any of clauses 11-22 further comprising an interposed coating layer, wherein the interposed coating layer is interposed between the first photochromic coating layer and the second photochromic coating layer, wherein the interposed coating layer is of a thickness at least sufficient to prevent migration of the at least one first photochromic compound into the second photochromic coating layer, and migration of the at least one second photochromic compound into the first photochromic coating layer.

Whereas particular features of this invention have been described above for purposes of illustration, it will be evident to those skilled in the art that numerous variations of the details of the present invention may be made without departing from the invention as defined in the appended claims.

The invention claimed is:
1. A photochromic article comprising:
   (a) a photochromic substrate having a fade half-life-A ($T_{1/2}$-A); and
   (b) a photochromic layer having a fade half-life-B ($T_{1/2}$-B) and being positioned between a first surface of the photochromic substrate and a source of actinic radiation,
   wherein the $T_{1/2}$-A is greater than the $T_{1/2}$-B.
2. The photochromic article of claim 1, wherein the $T_{1/2}$-A is greater than the $T_{1/2}$-B by a factor of at least 1.5, the $T_{1/2}$-A and the $T_{1/2}$-B each being measured at 23° C.

3. The photochromic article of claim 1, wherein the $T_{1/2}$-A is from 50 to 350 seconds, the $T_{1/2}$-A being measured at 23° C.

4. The photochromic article of claim 1, wherein the $T_{1/2}$-B is from 10 to 100 seconds, the $T_{1/2}$-B being measured at 23° C.

5. The photochromic article of claim 1, wherein the photochromic layer has a change in optical density (ΔOD) that is greater than 0.1 at photopic, the ΔOD being measured at 23° C.

6. The photochromic article of claim 1, further comprising an interposed layer, wherein the interposed layer is interposed between the first surface of the photochromic substrate and the photochromic layer.

7. The photochromic article of claim 1, further comprising a protective layer that is positioned over the photochromic layer.

8. The photochromic article of claim 1, wherein the photochromic substrate comprises at least one first photochromic compound and the photochromic layer comprises at least one second photochromic compound, wherein the at least one first photochromic compound is different from the at least one second photochromic compound.

9. The photochromic article of claim 8, wherein the at least one first photochromic compound and the at least one second photochromic compound are each independently selected from the group consisting of indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

10. The photochromic article of claim 8, further comprising an interposed layer, wherein the interposed layer is interposed between the first surface of the photochromic substrate and the photochromic layer, wherein the interposed layer is of a thickness at least sufficient to prevent migration of the at least one first photochromic compound into the photochromic layer, and migration of the at least one second photochromic compound into the photochromic substrate.

11. A photochromic article comprising:
(a) a photochromic substrate, wherein the photochromic substrate comprises a first surface defined by a first photochromic layer having a fade half-life-A ($T_{1/2}$-A); and
(b) a second photochromic layer having a fade half-life-B ($T_{1/2}$-B) and being positioned between the first photochromic layer and a source of actinic radiation,
wherein the $T_{1/2}$-A is greater than the $T_{1/2}$-B.

12. The photochromic article of claim 11, wherein the $T_{1/2}$-A is greater than the $T_{1/2}$-B by a factor of at least 1.5, the $T_{1/2}$-A and the $T_{1/2}$-B each being measured at 23° C.

13. The photochromic article of claim 11, wherein the $T_{1/2}$-A is from 50 to 350 seconds, the $T_{1/2}$-A being measured at 23° C.

14. The photochromic article of claim 11, wherein the $T_{1/2}$-B is from 10 to 100 seconds, the $T_{1/2}$-B being measured at 23° C.

15. The photochromic article of claim 11, wherein the first photochromic layer is a first photochromic coating layer and the second photochromic layer is a second photochromic coating layer.

16. The photochromic article of claim 15, wherein the second photochromic coating layer has a change in optical density (ΔOD) that is greater than 0.1 at photopic, the ΔOD being measured at 23° C.

17. The photochromic article of claim 15, further comprising a protective coating layer that is positioned over the second photochromic coating layer.

18. The photochromic article of claim 15, wherein the first photochromic coating layer and the second photochromic coating layer each independently comprise an organic matrix comprising at least one organic polymeric material.

19. The photochromic article of claim 18, wherein the organic polymeric material is chosen from polyurethanes, polyisocyanurates, polyureas, acrylates, poly(meth)acrylates, polyanhydrides, polyacrylamides, epoxy resins, melamines, and combinations thereof.

20. The photochromic article of claim 18, wherein the organic polymeric material of the first photochromic coating layer comprises polyurethane, polyisocyanurate, and combinations thereof.

21. The photochromic article of claim 18, wherein the organic polymeric material of the second photochromic coating layer comprises poly(meth)acrylate.

22. The photochromic article of claim 15, wherein the first photochromic coating layer comprises at least one first photochromic compound and the second photochromic coating layer comprises at least one second photochromic compound, wherein the at least one first photochromic compound is different from the at least one second photochromic compound.

23. The photochromic article of claim 22, further comprising an interposed coating layer, wherein the interposed coating layer is interposed between the first photochromic coating layer and the second photochromic coating layer, wherein the interposed coating layer is of a thickness at least sufficient to prevent migration of the at least one first photochromic compound into the second photochromic coating layer, and migration of the at least one second photochromic compound into the first photochromic coating layer.

* * * * *